United States Patent [19]

Gordon

[11] 4,158,846
[45] Jun. 19, 1979

[54] CONVERTIBLE GRAPHIC RECORDER

[75] Inventor: James F. Gordon, Saratoga, Calif.

[73] Assignee: Zeta Research, Inc., Lafayette, Calif.

[21] Appl. No.: 868,523

[22] Filed: Jan. 11, 1978

[51] Int. Cl.² .................... G01D 15/24; G03B 1/24; B65H 17/42

[52] U.S. Cl. ...................... 346/136; 226/79; 226/110

[58] Field of Search ............ 346/136; 226/79, 110

[56] References Cited

U.S. PATENT DOCUMENTS 3,799,313   3/1974   Shevick .................... 346/136 UX

FOREIGN PATENT DOCUMENTS 524638   5/1956   Canada .................... 346/136

Primary Examiner—George H. Miller, Jr.

Attorney, Agent, or Firm—Flehr, Hohbach, Test, Albritton & Herbert

[57] ABSTRACT

A graphic recorder convertible for use with multiple width strip chart paper. A rotatable main drum carries sets of sprocket teeth for transporting strip charts along an information transfer head. At least one set of sprocket teeth is formed by separable sprocket sections which are detachably mounted about a recess in the drum for use with a strip chart of one width. Filler inserts are mounted in the recess in place of the separable sprockets for use with a chart of another width. Means is provided for positioning the separable sprocket teeth in precise angular agreement with the other sets of sprocket teeth. Compensator means is provided for ensuring angular agreement of the teeth on one sprocket section with the teeth on the other section.

14 Claims, 10 Drawing Figures

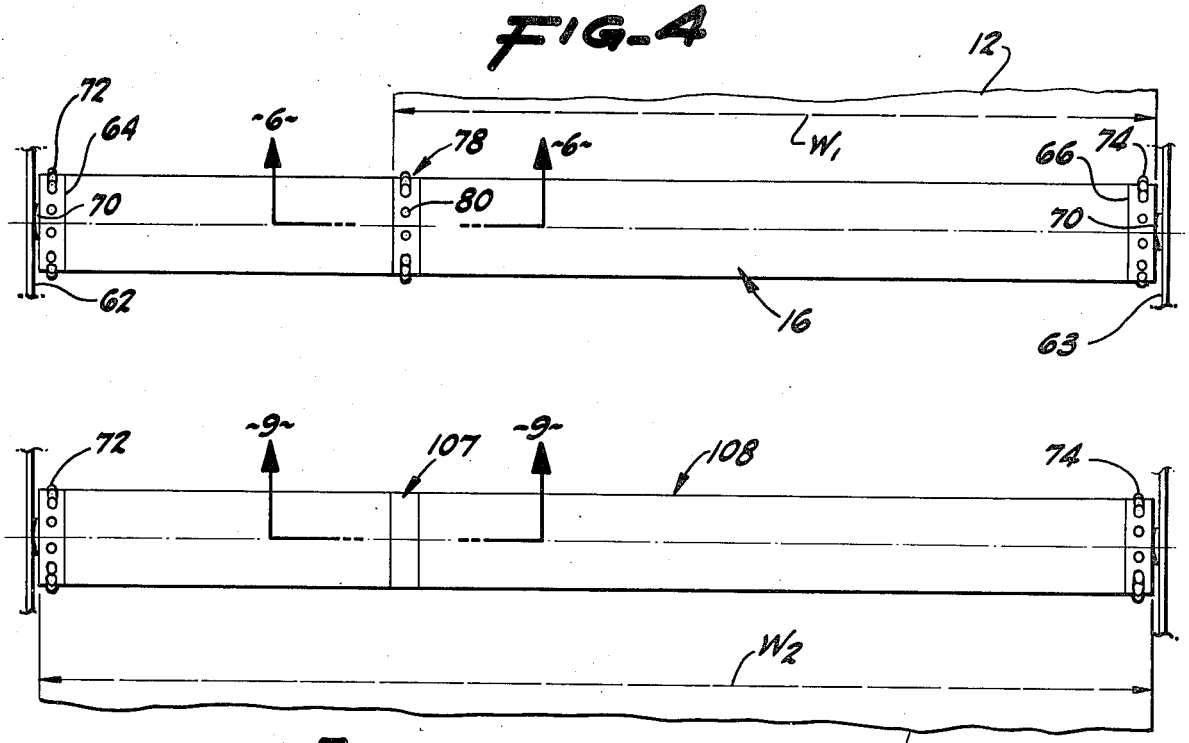
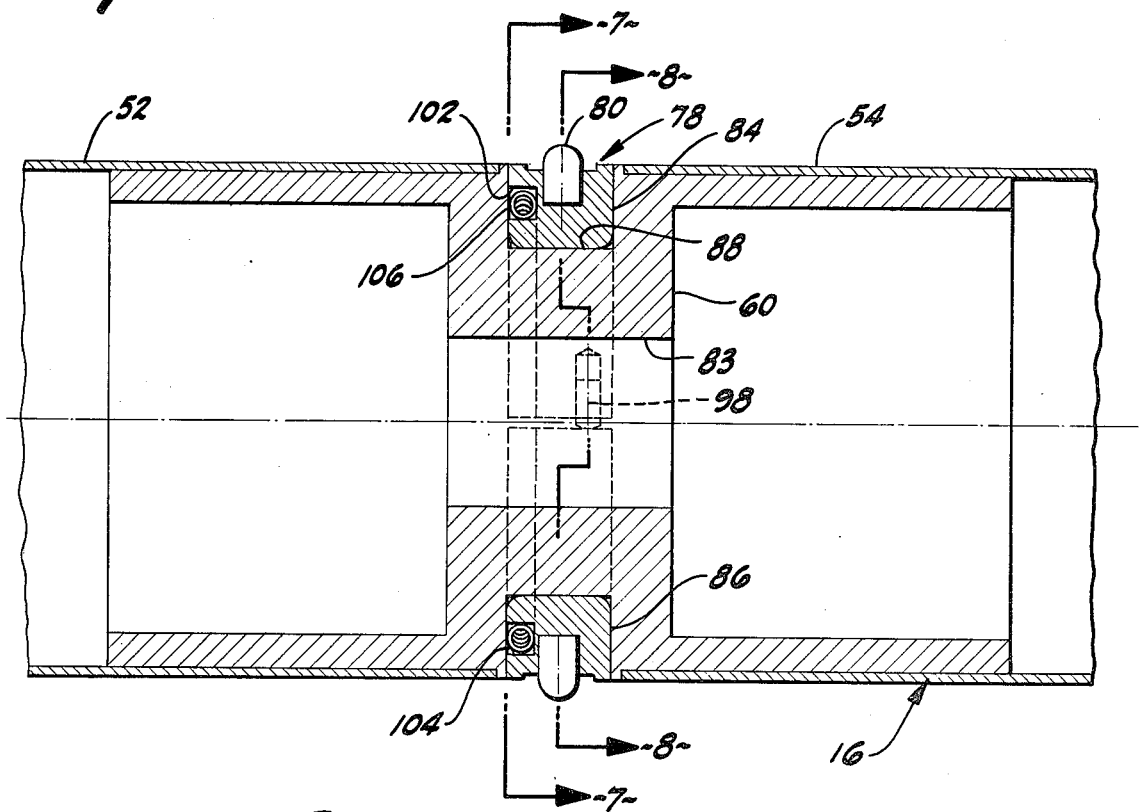

CONVERTIBLE GRAPHIC RECORDER

BACKGROUND OF THE INVENTION

This invention in general relates to graphic recorders, such as incremental plotters, for recording information on strip charts. Heretofore graphic recorders of this type have been constructed solely for use with a strip chart of a certain width such that separate recording devices would be required for recording information on different size chart paper. Thus the need has been recognized for providing a graphic recorder having the capability of accepting multiple width chart paper, and which is simple and fast to convert to the different paper without altering the performance and reliability of the machine.

SUMMARY AND OBJECTS OF THE INVENTION

It is a general object of the invention to provide a new and improved graphic recorder adaptable for use with multiple width strip charts.

Another object is to provide a recorder of the character described which is simple and fast to convert for use with different chart paper, and which does not require removal of the entire chart transport drum for this purpose.

Another object is to provide a recorder of the character described which is convertible without requiring separate drums for different strip charts, and in which the equipment required for conversion is simple, lightweight and relatively inexpensive.

Another object is to provide a recorder of the character described in which conversion for use with the different strip charts does not affect performance and reliability, in which the change-over procedure does not require critical adjustments, and in which the conversion can be made by relatively unskilled personnel with a minimum of machine down time.

The invention in summary includes a graphic recorder having a rotatable drum for transporting a strip chart adjacent an information transfer head. The drum carries axially spaced-apart sets of sprocket teeth which releasably engage positioning openings formed in the strip chart. A separable sprocket is detachably mounted on the drum at a position axially spaced from the other sets of sprocket teeth for use with a chart of one width. The separable sprocket is removed and replaced by a separable filler insert for use with a chart of another width.

The foregoing and additional objects and features of the invention will appear from the following specification in which the several embodiments have been set forth in detail in conjunction with the accompanying drawings.

BRIEF DESCRIPTION OF THE DRAWINGS

FIG. 4 is a front elevational view of the main drum of the recorder of FIG. 1 shown converted for use with a narrow strip chart.

FIG. 5 is a front elevational view of the drum of FIG. 4 shown converted for use with a wide strip chart.

FIG. 6 is a fragmentary axial section view to an enlarged scale taken along the line 6—6 of FIG. 4.

DESCRIPTION OF THE PREFERRED EMBODIMENTS

Figure 1:
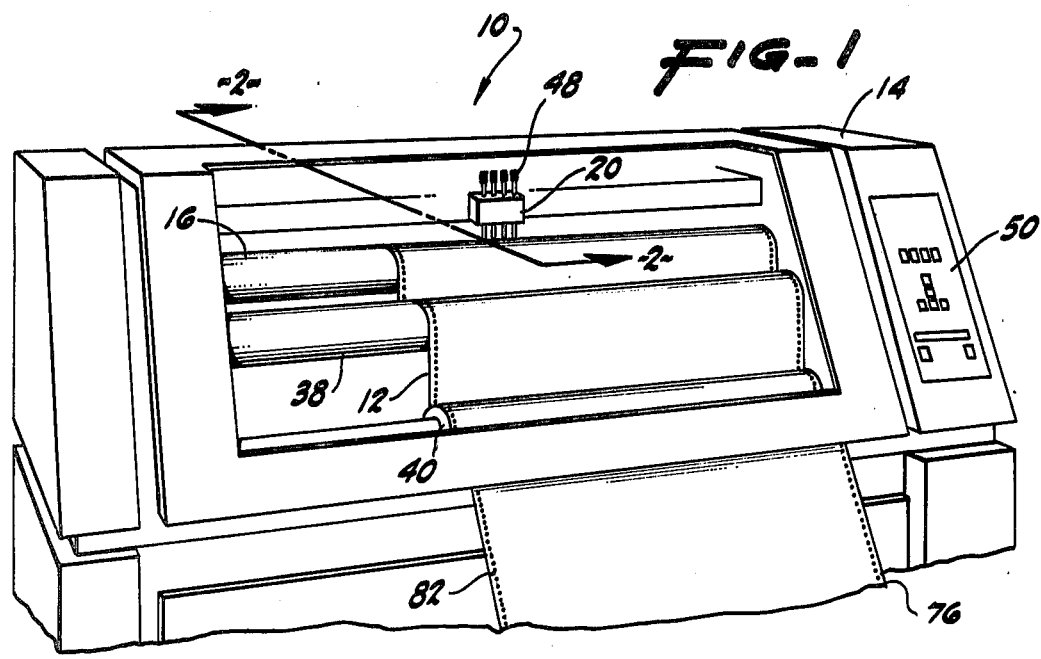
FIG. 1 is a perspective view of a graphic recorder incorporating the invention.
Figure 2:
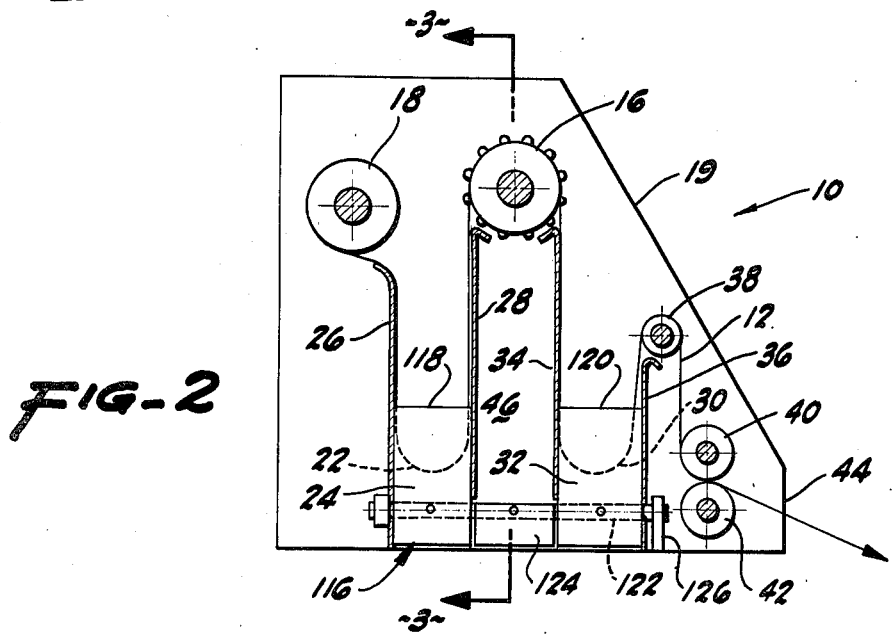
FIG. 2 is a cross-sectional view taken along the line 2—2 of FIG. 1.

In the drawings FIG. 1 illustrates generally at 10 a graphic recorder of the invention comprising an incremental plotter. In accordance with the invention, recorder 10 is capable of recording information on multiple width strip charts. In FIGS. 1 and 4 the recorder is illustrated converted for use with a strip chart 12 of narrow width $W_1$. The recorder can be converted for use with a strip chart of greater width $W_2$ (FIG. 5).

Recorder 10 includes a housing 14 which rotatably mounts a cylindrical main drum 16 for transporting the chart paper from a supply roll 18 across the path of an information transfer head 20. The chart paper is fed from the supply roll in a path which leads downwardly through a loop 22 above a chamber 24 formed between a pair of upstanding walls 26, 28. The chart paper is discharged from the main drum along a path leading downwardly through a loop 30 above another chamber 32 defined between a pair of upstanding walls 34, 36 and thence to an idler roller 38. From the idler roller the chart paper is directed downwardly between a pair of pinch rollers 40, 42 and thence outwardly through a slot 44 formed in the front of the recorder housing. While the illustrated embodiment shows the supply of chart paper in the form of a roll, the supply could also be fan-fold paper moved by suitable pinch rollers or by sprockets into the loop 30 upstream of the main drum. Also, while the illustrated embodiment shows the paper being discharged from the housing by the pinch rollers, the pinch rollers could be replaced by a suitable take-up reel adapted to wind up the discharging paper into a roll.

A chamber 46 formed below the main drum communicates below walls 28 and 34 with the chambers 24 and 32. Suitable means such as an exhaust blower, not shown, is provided for creating a vacuum in the three chambers. The loops of chart paper serve as diaphragms against which the resultant force of air pressure acts downwardly so as to tension the chart against the surface of the main drum. The cylindrical surface of the main drum provides a backing under the paper for application of marking elements, such as the pens 48, on information transfer head 20. The information transfer head is mounted for back-and-forth movement transversely of the path of the chart under influence of command signals from a suitable control circuit in the recorder. A control panel 50 provided at a front side of the housing includes suitable buttons and switches for operating the control circuit to coordinate movement and operation of the marking elements with movement of the strip chart according to the particular program being run.

In the configuration illustrated in FIG. 1 the recorder 10 is converted for use with the narrow strip chart. In this configuration the drum assembly 16 of FIG. 4 is employed. Drum assembly 16 includes a pair of cylindrical shells 52, 54 forming left and right drum sections. The shells are fixedly mounted together by a cylindrical center section 60. The shells are rotatably carried at their opposite ends on frame plates 62, 63 by end sprockets 64, 66 which are mounted on stub shafts 68, 70. The end sprockets are provided with first and second sets of sprocket teeth or pins 72, 74. The end sprockets are carefully fitted on the drum sections so that corresponding sprocket teeth at the two ends are in angular agreement. The teeth project radially outwardly for releasable engagement with equally spaced-apart positioning holes which are formed in rows along the side margins of the strip chart. The set of sprocket teeth 74 are adapted to engage the row of positioning openings 76 on the right-hand side of the narrow width strip chart. A separable sprocket 78 provided with a third set of sprocket teeth 80 is mounted about a midportion of the drum for releasable engagement with the row of positioning openings 82 formed along the left-hand side of the narrow width chart.

An axially extending through-hole 83 is formed through the center section 60. A suitable viscous liquid is contained within the left and right drum sections and the through-hole for providing rotational damping to the drum.

Separable sprocket 78 comprises a pair of arcuate or semi-circular half sprockets 84, 86 which are detachably mounted in an annular recess 88 formed in center section 60. The recess and half sprockets are precisely machined for a close, minimum tolerance fit so that the sprocket teeth 80 are in axial register with the row of positioning openings 82 on the chart. Means is also provided for ensuring precise angular agreement between the half sprocket teeth 80 and the second set of sprocket teeth 74. The means includes a key 90 which is threaded into a radially extending opening 92 formed in one half sprocket 84. A radially extending keyhole 94 is formed in the center section for seating the inwardly projecting portion of the key. The keyhole is precisely located on the center section for locking the half sprockets at a predetermined angular location on the drum at which the two sets of sprocket teeth are in angular agreement.

Preferably separable sprocket 78 is formed by first machining a circular sprocket blank having an outer diameter commensurate with the drum outer diameter and then cutting the blank along a diameter into the half sprockets. A pair of compensator set screws 96, 98 are threaded into holes formed in the faces of one half sprocket to accommodate for the saw kerf made upon cutting the sprocket blank. The set screws are adjusted in their respective holes so that their heads project outwardly into abutment with the end faces 100 of the opposing half sprocket 86 an amount sufficient to compensate for the width of the saw kerf and thereby maintain angular agreement between the teeth on the half sprockets.

The separable sprocket is detachably assembled in recess 88 by means of annular grooves 102, 104 formed about common sides of the half sprockets. A flexible member, such as the illustrated garter spring 106, is hooked into a loop and mounted under tension within the grooves for applying an inward force holding the half sprockets against the bottom of the recess. The half sprockets can be removed from the recess by means such as pulling the half sprockets apart and out of the recess with adhesive tape so that the garter spring can be slipped out of the grooves and unhooked.

Recorder 10 is converted for operating with wide strip chart paper 105 by using the drum assembly configuration 108 shown in FIG. 5. For making the conversion the half sprockets 84, 86 are removed from the main drum in the manner described above. A separable adapter 107 comprising a pair of semi-circular inserts 108, 110 is provided for mounting in the recess. The outer surfaces of the inserts are coextensive with outer surfaces of the left and right drum sections 52, 54 to permit the chart paper to be stretched uniformly across the drum while the inserts provide a backing under the paper for operation of the pens on the information transfer head. In this configuration the first and second sets of sprocket teeth 72, 74 on the drum engage opposite rows of positioning openings in the wide chart paper.

The separable adapter inserts 108 and 110 are detachably mounted in recess 88 by means of circular grooves 112, 114 formed in a common side of the inserts. A flexible member such as the greater spring 106 is hooked in a loop and mounted under tension in the groove for applying an inward force urging the inserts against the recess. The inserts can be detached from the drum by means such as pulling the sections apart with adhesive tape so that the spring can be slipped out of the grooves and unhooked.

Figure 3:
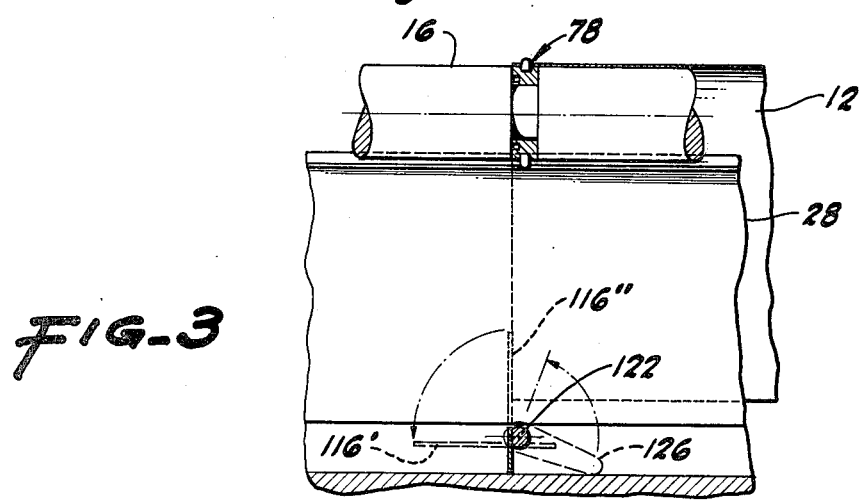
FIG. 3 is a cross-sectional view taken along the line 3—3 of FIG. 2.
Figure 7:
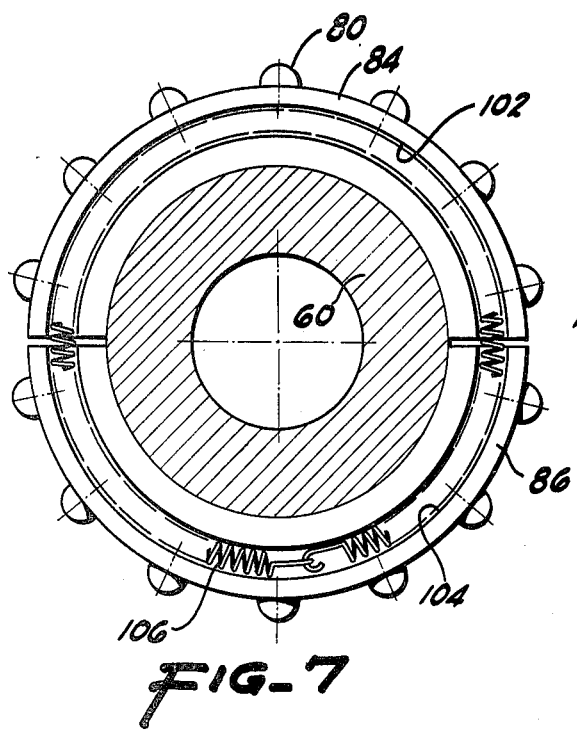
FIG. 7 is a cross-sectional view taken along the line 7—7 of FIG. 6.
Figure 8:
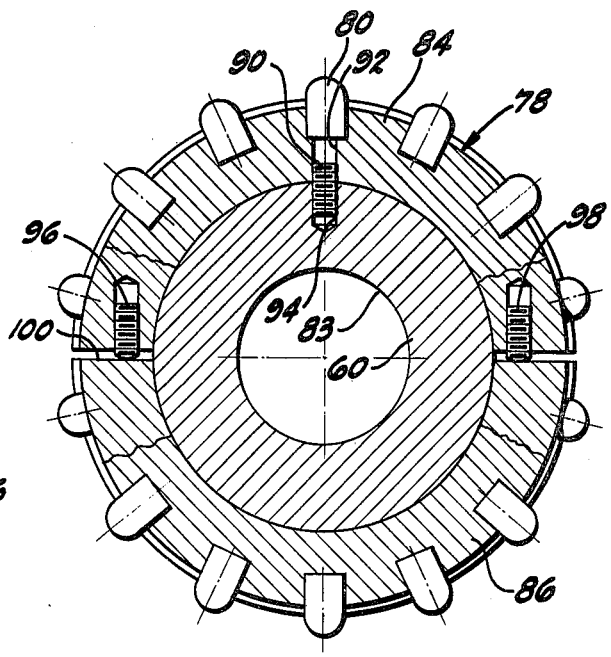
FIG. 8 is a cross-sectional view taken along the line 8—8 of FIG. 6.
Figure 10:
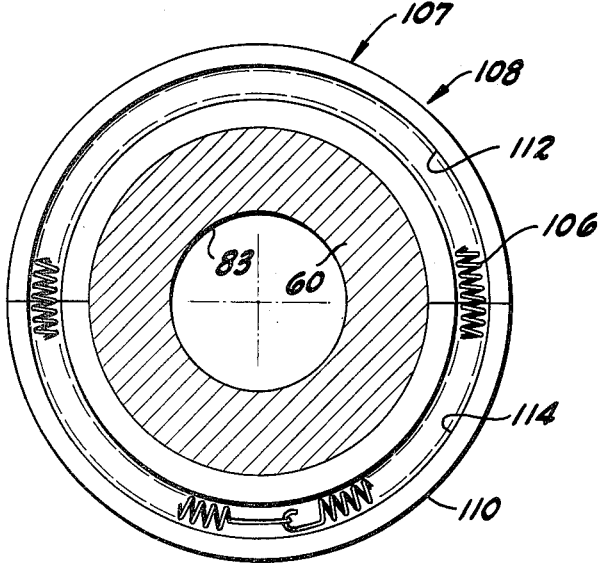
FIG. 10 is a cross-sectional view taken along the line 10—10 of FIG. 9.
Figure 9:
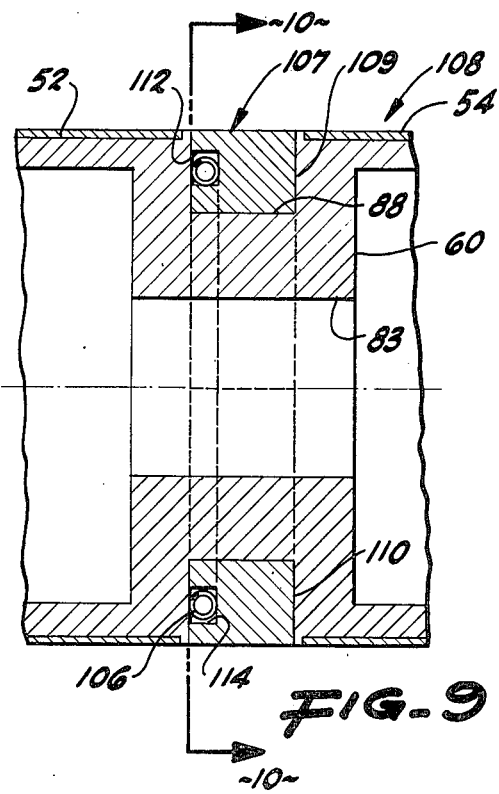
FIG. 9 is a fragmentary axial section view taken along the line 9—9 of FIG. 5.

A vane assembly 116 is provided for maintaining the vacuum beneath the paper loops when using the narrow width strip chart. The vane assembly includes a pair of flat end vanes 118, 120 mounted on a pivot shaft 122 at opposite ends of a short-length center vane 124. The pivot shaft is mounted on the base of the recorder housing in a plane extending transversely of the main drum and approximately in vertical register below the location of separable sprocket 78. An operating handle 126 is mounted on an end of the shaft for moving the vanes through an arc between a horizontal position shown at 116′ in FIG. 3 and a vertical position shown at 116″ in the Figure. In the vertical position the end vanes 118, 120 extend upwardly across the lower end margins of the two chart loops 22, 30 so as to close off the functioning portion of the vacuum chamber beneath the loops and thereby reduce the entry of air which would otherwise occur due to absense of chart paper on the exposed portion of the drum when narrow width strip chart paper is used. The vanes are moved to their horizontal position so that the vacuum is applied throughout the entire volume of the chamber when wide chart paper is used.

The use and operation of the invention is as follows. The recorder 10 is converted for use with narrow width strip chart paper by assembling the drum in the configuration 16 of FIG. 4. The pair of half sprockets 84, 86 are mounted together about the drum with garter spring 106 hooked together and seated in the grooves. The half sprockets are slipped into recess 88 with key 90 aligned with keyhole 94 of center section 60. Angular agreement between the teeth of the two half sprockets can be checked and, as required, the half sprockets can be removed, set screws 96, 98 adjusted and the half sprockets reassembled until the desired alignment is achieved. The supply roll 18 of chart paper is mounted in the recorder and trained along the looped paths and across the main drum 16 with the rows of positioning openings 76 and 82 engaging the respective sprocket teeth 74 and 80. The tail of the paper is trained over idler roller 38 and through pinch rollers 40, 42. Handle 126 is turned down to move the vanes to their vertical positions and the blower motor is energized to establish a vacuum urging the loops downwardly to tension the chart against the surface of the main drum. Control panel 50 is operated to advance the chart paper and move the information transfer head in accordance with the program of the control circuit for recording information on the chart.

Recorder 10 is converted for use with wide strip chart paper by detaching the half sprockets from the main drum. Separable inserts 108 and 110 are then mounted by spring 106 in the recess. A supply roll of wide paper is mounted in the recorder and trained along the looped paths across the main drum with the first and second sets of sprocket teeth 72, 74 engaging the chart positioning openings. Handle 126 is turned up to move the vanes to their horizontal positions so that the vacuum is established across the entire width of the chambers. The control panel is operated to advance the chart paper and move the information transfer head for recording information, with the outer surfaces of the adapter inserts providing a backup to the pens as the head moves over the inserts.

It will be realized from the foregoing that the invention provides a graphic recorder which enhances the range of use of a single machine by providing the capability of accepting multiple width chart paper. While the specific example has been described as convertible for use with two sizes of chart paper, the invention contemplates that a plurality of separable sprockets could be mounted at different positions on the main drum for use with additional sizes of chart paper. For example, the use of two separable sprockets between the fixed end sprockets on the drum would permit the recorder to be used with chart paper of three different widths.

It will further be seen from the foregoing that the recorder of the invention can be easily converted between its different configurations in a manner which permits relatively unskilled personnel to make the conversion. In addition, it is not necessary to perform adjustments to ensure alignment of the parts each time a conversion is made. The invention does not require the mounting of a separate main drum for each width of chart paper. Instead, the conversion equipment in the invention is relatively simple, lightweight and inexpensive. The conversion between the configurations can be rapidly performed so that machine down-time is at a minimum. Furthermore, the performance and reliability of the recorder are not affected by converting the recorder between the different configurations.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. In a graphic recorder for use with multiple width strip charts having positioning openings formed along the charts, said recorder having an information transfer head for transferring information to the charts, including the combination of a rotatable drum for transporting the strip chart along a path adjacent the information transfer head, means forming axially spaced-apart first and second sets of sprocket teeth about the drum for releasably engaging the positioning openings on a first chart of given width, means forming a third sprocket detachably mounted on the drum at a position axially spaced from both the first and second sets of sprocket teeth, said third sprocket including a third set of sprocket teeth for releasably engaging positioning openings along a second strip chart of a width which differs from said given width, said first chart being used in the recorder when the third sprocket is detached from the drum and said second chart being used in the recorder when the third sprocket is mounted on the drum.

2. The combination of claim 1 in which the third sprocket is mounted on the drum at a position between the first and second sets of sprocket teeth, and the second strip chart is of a width narrower than said given width and has a pair of rows of positioning openings with one row being engaged by the third set of sprocket teeth and the other row being engaged by either the first or second sets of sprocket teeth.

3. The combination of claim 2 which includes means forming at least one annular recess about the drum between the first and second sets of sprocket teeth, and said third sprocket includes a circular insert for detachably mounting in the recess with the third set of sprocket teeth projecting radially outwardly from the insert.

4. The combination of claim 3 in which the insert is formed with a cylindrical outer surface coextensive with the outer surface of the drum.

5. The combination of claim 3 which includes a second circular insert for detachably mounting in the recess when the first-mentioned insert is detached from the recess, said second insert having a cylindrical outer surface coextensive with the outer surface of the drum to permit the first chart to be mounted on the drum across the second insert.

6. The combination of claim 3 in which the circular insert includes a sprocket comprising arcuate sections and means for detachably mounting the sections together to form a ring mounted in the recess coaxial with the drum.

7. The combination of claim 6 in which the arcuate sections comprise semi-circular half-sprockets.

8. The combination of claim 6 in which the means for detachably mounting the sections together includes means forming a groove about a common side of the arcuate sections together with a flexible member mounted under tension in a loop in the groove for applying a force to hold the sections together, said flexible member being capable of elongating to permit separation of the sections for detaching from the recess.

9. The combination of claim 6 which includes means forming at least one radially inwardly projecting key on at least one of the arcuate sections together with means forming a keyhole in the drum for seating the key and locking the insert for rotation with the drum, said keyhole being formed at a predetermined position on the drum for locating the third sprocket means in angular agreement with the other of the sets of sprocket teeth which engage the second strip chart.

10. The combination of claim 6 in which each arcuate section has opposite end faces which are juxtaposed with corresponding end faces of the other section when mounted together to form a ring, and compensator means mounted between adjacent end faces of the section for positioning the end faces in predetermined relationship to bring the sprocket teeth on one section into angular agreement with the sprocket teeth on the other section.

11. A recorder for graphically recording information on strip charts, including the combination of a housing, a cylindrical drum rotatably mounted in the housing, means forming a first set of sprocket pins about one end of the drum, means forming a second set of sprocket pins about the other end of the drum, said first and second sets of pins being axially spaced-apart a predetermined distance for engaging respective rows of positioning openings formed along a first strip chart of given width, means forming at least one annular recess about the drum axially positioned from the first and second sets of pins, means forming separable sprocket sections, means forming a third set of sprocket pins about the sprocket sections whereby with the sprocket sections mounted together to form a ring in the recess the third set of pins are adapted to engage rows of positioning openings formed along a second strip chart which is used in the recorder alternatively to the first chart.

12. A recorder as in claim 11 which includes means for detachably mounting the sprocket sections in the recess, together with means forming separable filler sections, and means for detachably mounting the filler sections together in the recess to form an outer annular surface coextensive with the outer surface of the drum, said filler sections being mounted in the recess in place of the separable sprocket sections when the first chart is used in the recorder.

13. A recorder as in claim 11 which includes chart supply means for directing the strip chart along an infeed path toward the drum, take-away means for directing the strip chart along a discharge path from the drum, means for applying a differential air pressure to common sides of portions of the chart along the infeed and discharge paths to produce resultant forces acting on said portions for tensioning the chart against the drum, said means for applying the differential pressure including means forming a vacuum chamber on a side of the chart along the infeed and discharge paths, and means forming a barrier in the vacuum chamber to reduce entry of air into the functioning portion of the chamber which is below the second strip chart when the latter is used in the recorder.

14. A recorder as in claim 13 in which the means forming a barrier includes closure means mounted in the housing for movement between a first position extending transversely across the chamber substantially in register with the side of the strip chart which moves over the half sprockets whereby the closure means reduces entry of air into the functioning portion of the chamber below the second chart, said closure means being movable to another position out of register with said end of the second chart when the first chart is used in the recorder.

* * * * *